United States Patent [19]
Lien

[11] Patent Number: 5,907,380
[45] Date of Patent: May 25, 1999

[54] LIQUID CRYSTAL CELL EMPLOYING THIN WALL FOR PRE-TILT CONTROL

[75] Inventor: Shui-Chih Alan Lien, Briarcliff Manor, N.Y.

[73] Assignee: International Business Machines Corporation, Armonk, N.Y.

[21] Appl. No.: 08/960,826

[22] Filed: Oct. 30, 1997

[51] Int. Cl.$^6$ .................. G02F 1/1343; G02F 1/1333
[52] U.S. Cl. .................. 349/141; 349/147; 349/122
[58] Field of Search .................. 349/139, 144, 349/122, 146, 141, 147

[56] References Cited

U.S. PATENT DOCUMENTS

| | | | |
|---|---|---|---|
| 4,221,471 | 9/1980 | Gurtler | 350/331 R |
| 4,632,514 | 12/1986 | Ogawa et al. | 349/107 |
| 4,902,106 | 2/1990 | Dijon et al. | 350/350 S |
| 4,997,264 | 3/1991 | Coulson | 350/341 |
| 5,000,545 | 3/1991 | Yoshioka et al. | 349/132 |
| 5,084,778 | 1/1992 | DeJule et al. | 359/87 |
| 5,172,255 | 12/1992 | Brosig et al. | 359/76 |
| 5,309,264 | 5/1994 | Lien et al. | 359/87 |
| 5,313,562 | 5/1994 | Wiltshire | 359/77 |
| 5,418,635 | 5/1995 | Mitsui et al. | 349/139 |
| 5,434,690 | 7/1995 | Hisatake et al. | 359/87 |
| 5,453,862 | 9/1995 | Toko et al. | 359/76 |
| 5,477,351 | 12/1995 | Takahara et al. | 349/5 |
| 5,493,426 | 2/1996 | Johnson et al. | 359/40 |
| 5,493,429 | 2/1996 | Kanemoto et al. | 349/106 |
| 5,500,750 | 3/1996 | Kanbe et al. | 349/139 |
| 5,576,862 | 11/1996 | Sugiyama et al. | 359/75 |
| 5,610,741 | 3/1997 | Kimura | 349/139 |
| 5,644,372 | 7/1997 | Shinjo et al. | 349/139 |
| 5,654,782 | 8/1997 | Morokawa et al. | 349/49 |
| 5,726,727 | 3/1998 | Shibahara et al. | 349/146 |
| 5,745,206 | 4/1998 | Koike et al. | 349/117 |

OTHER PUBLICATIONS

"Macromolecules—Microscopic Molecular Reorientation of Alignment Layer Polymer Surfaces Induced by Rubbing and Its Effects on LC Pretilt Angles", vol. 29, No. 27 pp. 8894–8899, IBM Watson Research Center, K.–W. Lee et al., Sep. 1996.

"Liquid crystal quasihomeotropic orientation induced by a polymer deposited on a SiO surface", L. Rousille and J. Robert, J. Appl. Phys. 50(6), Jun. 1979, pp. 3975–3977.

*Primary Examiner*—Tiep H. Nguyen
*Attorney, Agent, or Firm*—Scully, Scott, Murphy & Presser; Jay P. Sbrollini

[57] ABSTRACT

A liquid crystal cell has a first substrate having a pixel electrode formed thereon, wherein the pixel electrode has a characteristic width; and a second substrate having a transparent conductive electrode layer formed thereon. Liquid crystal material is disposed between the pixel electrode and the transparent electrode layer. A wall of transparent conductive material projects from the transparent conductive electrode layer toward the liquid crystal material. The width of the wall is less than the characteristic width of the pixel electrode. The wall may comprise a transparent material layer formed on the second substrate and the transparent conductive electrode layer formed on the layer of transparent material. In the alternative, the wall may comprise a transparent conductive material layer formed on the transparent conductive electrode layer. The wall provides a lateral field that controls tilt direction of said liquid crystal material. The wall can also be a transparent non-conductive material projects from the transparent conductive electrode layer toward the liquid crystal material. The slope of the side walls of the wall control the tilt direction of liquid crystal material in the cell.

24 Claims, 16 Drawing Sheets

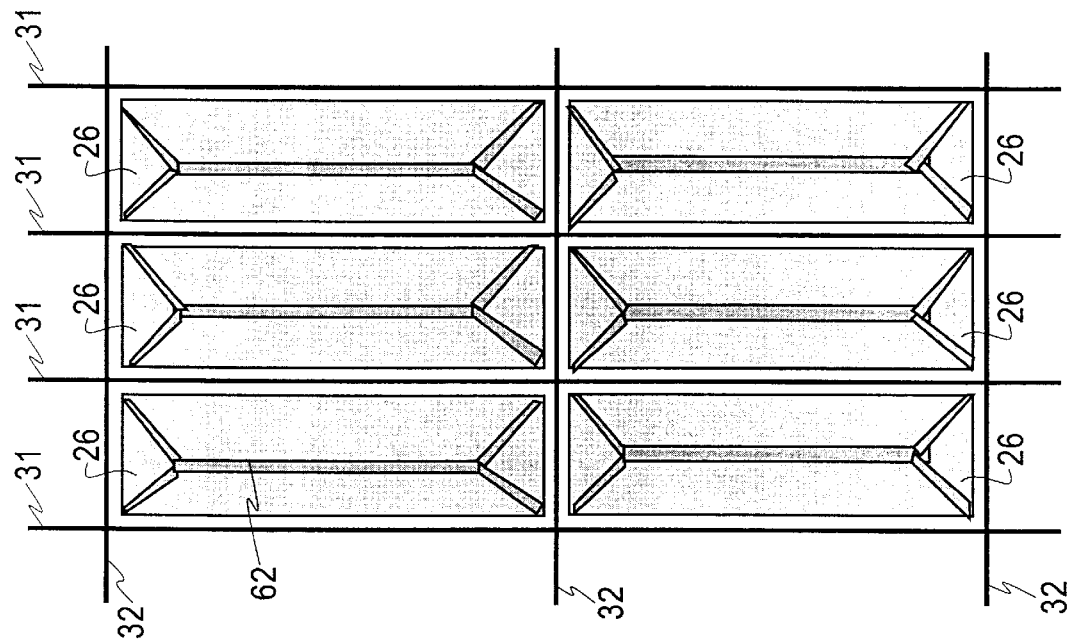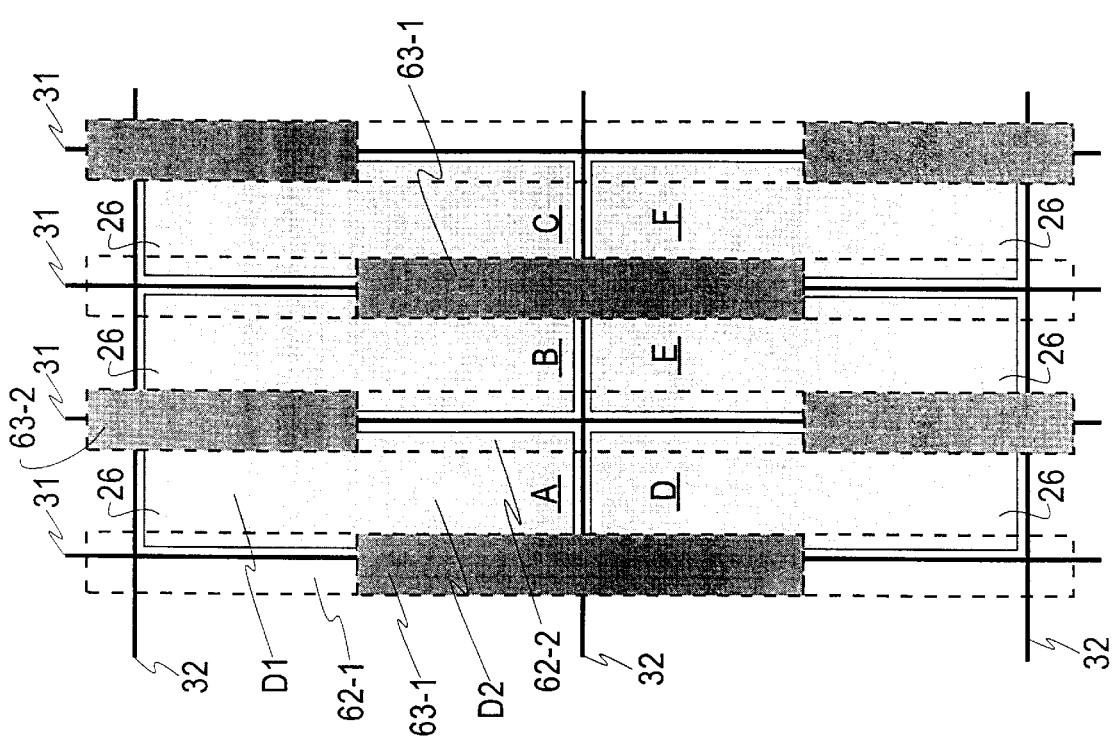

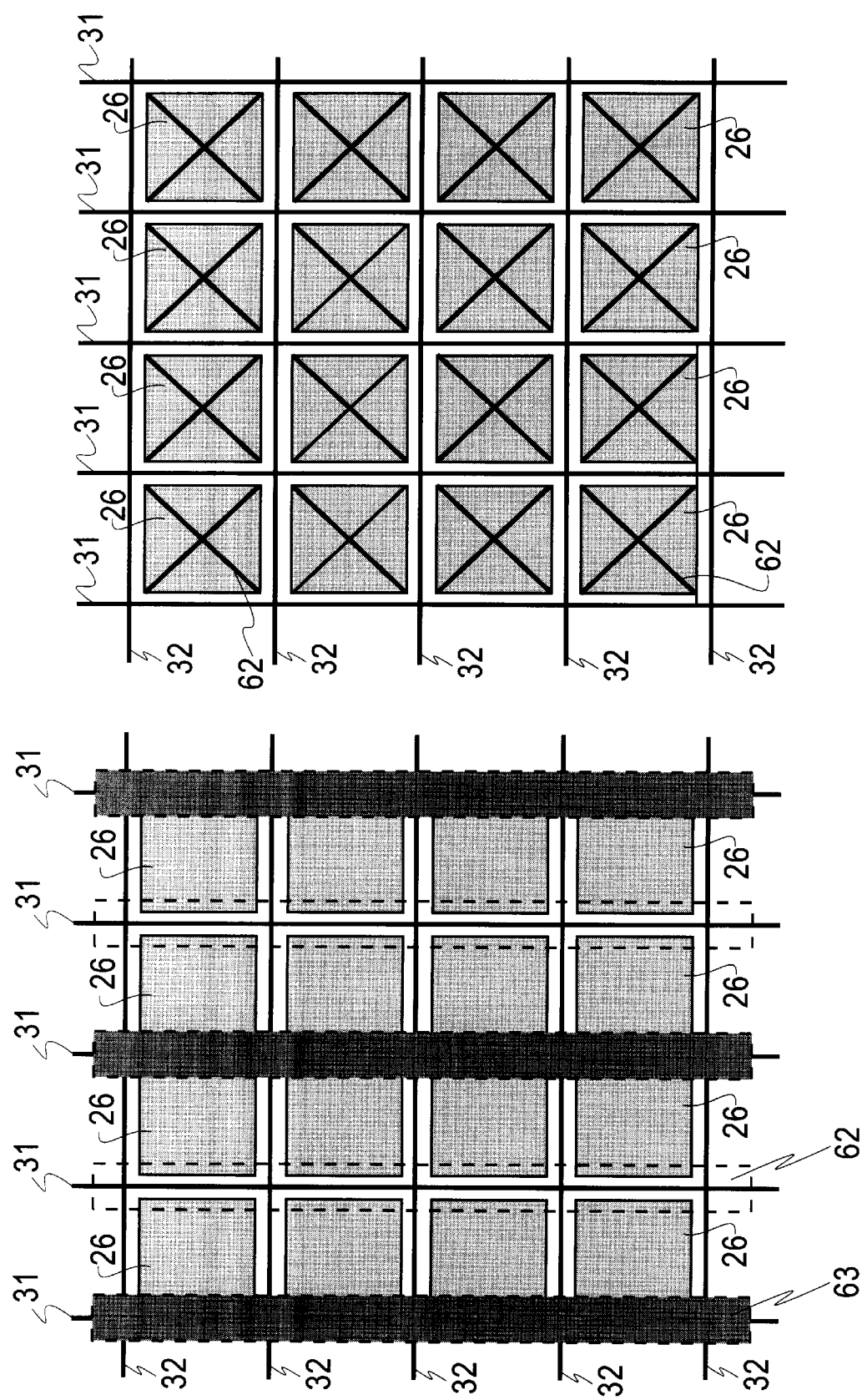

LIQUID CRYSTAL CELL EMPLOYING THIN WALL FOR PRE-TILT CONTROL

BACKGROUND OF THE INVENTION

1. Technical Field

This invention relates to liquid crystal displays (LCD's), and, more particularly to liquid crystal displays of the homeotropic and twisted nematic type having multi-domain cells.

2. Background Art

Flat panel displays have been become increasingly important in the computer industry and in other industries where the display of information is important. These types of displays provide unique opportunities for lowering the weight, size and eventually the cost of displaying information.

Liquid crystal displays seem to hold the most promise as the technology which will eventually be utilized in almost all practical flat panel displays. Considerable success has been achieved in small size color televisions and in monochrome flat panel displays as well as larger sizes used in color notebook or laptop computers. However, unlike the cathode ray tube display, which exhibits good viewing quality from a variety of angles, conventional liquid crystal displays suffer from a lose of contrast or contrast reversal when viewed from an angle other than normal to the plane of the display. This is due to the interaction of light with the molecules of the liquid crystal material in the liquid crystal display cells which make the flat panel display. Light traveling through these display cells at other than a normal angle of incidence interacts with the liquid crystal display molecules in a manner different from that of light traveling with normal incidence. The contrast between a light transmissive (white) state and a non-transmissive state (black) at other than the normal angle is drastically decreased, thus making such displays less desirable for use in many applications, such as flat panel television screens and large computer screens.

There have been various attempts to solve this problem. One method is discussed in U.S. Pat. No. 05,309,264, assigned to the assignee of the present invention, wherein a pattern of openings is formed in the common electrode. Such openings cause the display elements of the display to have more than one liquid crystal domain. This is a elegant approach; however, in order to provide sufficient optical performance, the width of such openings is required to be about twice that of the cell gap or larger. Importantly, for high density displays, the width of a given display element may be in the order of twice or triple the cell gap. In this case, this method becomes ineffective.

SUMMARY OF THE INVENTION

The above stated problems and related problems of the prior art are solved with the principles of the present invention, multi-domain liquid crystal cell employing thin wall(s) for pre-tilt control. In accordance with the invention, a liquid crystal cell comprises a first substrate having a pixel electrode formed thereon, wherein the pixel electrode has a characteristic width; and a second substrate having a transparent conductive electrode layer formed thereon. Liquid crystal material is disposed between the pixel electrode and the transparent conductive electrode.

In one embodiment of the present invention, at least one wall of transparent conductive material projects from the transparent conductive electrode layer and/or the pixel electrode layer toward the liquid crystal material. The width of the wall is less than the characteristic width of the pixel electrode. The wall preferably has steep side walls which may be formed, for example, by directional reactive ion etching techniques. The wall(s) provide an electric field that is combined with the electric field provided by the edge of the pixel electrode to control tilt direction of the liquid crystal material in the pixel. The wall that projects from the pixel electrode may comprise the pixel electrode layer formed on a layer of transparent non-conductive material, or may comprise a transparent conductive material formed on the pixel electrode layer. The wall that projects from the transparent conductive electrode may comprise the transparent conductive electrode layer formed on a transparent non-conductive material, or may comprise a transparent conductive material formed on the transparent conductive electrode layer.

In another embodiment, at least one wall of transparent non-conductive material projects from the transparent conductive electrode layer and/or the pixel electrode layer toward the liquid crystal material. The width of the wall is less than the characteristic width of the pixel electrode. The wall preferably has rounded side walls which may be formed, for example, by traditional wet etching techniques.

The liquid crystal cell of the present invention may be used in a multi-domain homeotropic liquid crystal display. Typically, a multi-domain homeotropic liquid crystal display requires one or more rubbing steps for the alignment layers of the cell. Advantageously, the liquid crystal cell of the present invention may be used to form a multi-domain homeotropic liquid crystal display without such rubbing.

In addition, the liquid crystal cell of the present invention may be used in a multi-domain homogeneous liquid crystal display. Typically, multi-domain homogeneous liquid crystal display require multiple rubbing directions for each substrate. Advantageously, the liquid crystal cell of the present invention may be used to form a multi-domain homogeneous liquid crystal display with only one rubbing direction per substrate.

In addition, the liquid crystal cell of the present invention may be used in a crossover type liquid crystal display wherein gate lines and data lines are disposed on one substrate and insulated from one another at crossover regions, or a non-crossover type with gate lines, pixel electrodes and active devices on one substrate and data lines on other substrate.

Furthermore, the liquid crystal cell of the present invention may be used in a transmissive- type liquid crystal display device. It may also be used in a reflective-type liquid crystal display device.

DESCRIPTION OF THE DRAWINGS

FIGS. 6(A), (B), (D) and (E) illustrate a transparent conductive wall for homeotropic LC cells and homogenous LC cells according to the present invention. FIGS. 6(C) and (F) illustrate a transparent non-conductive wall for homeotropic LC cells and homogenous LC cells according to the present invention.

FIG. 5 and FIG. 7 to FIG. 11 illustrate configurations of the wall for various embodiments of homeotropic liquid crystal cells with rectangular pixel cells.

FIG. 12 to FIG. 15 illustrate configurations of the wall for various embodiments of homeotropic liquid crystal cells with square pixel cells.

DETAILED DESCRIPTION OF THE PREFERRED EMBODIMENT

Figure 1:
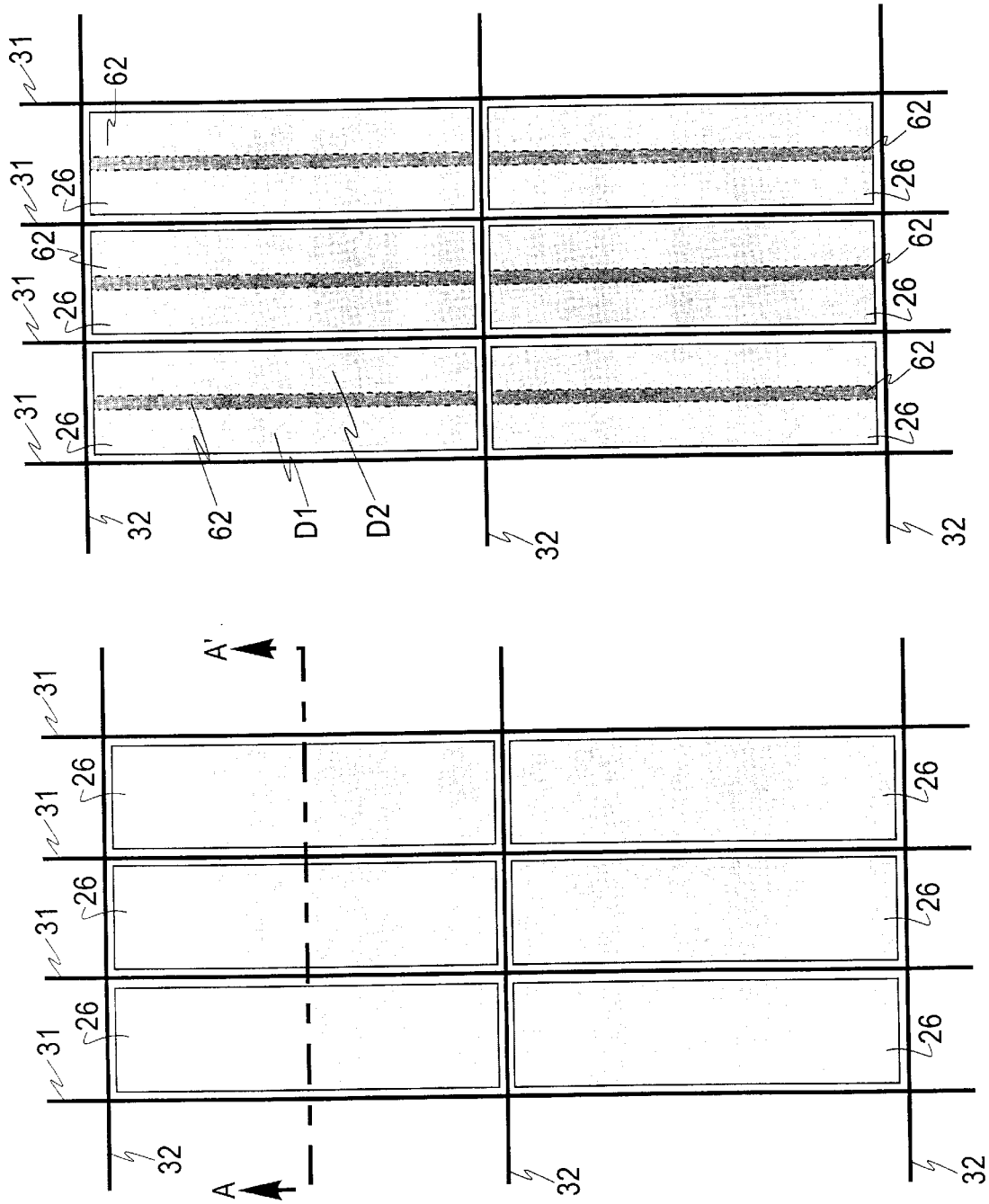
FIG. 1 is a top view of a conventional crossover type active-matrix liquid crystal display device.

FIG. 1 illustrates a top view of a conventional liquid crystal display device wherein a pixel electrode 26 (shaded region) is formed below the pixels (6 shown) of the display. The pixels are formed between gate lines 32 (3 shown) and data lines 31 (4 shown).

Figure 2:
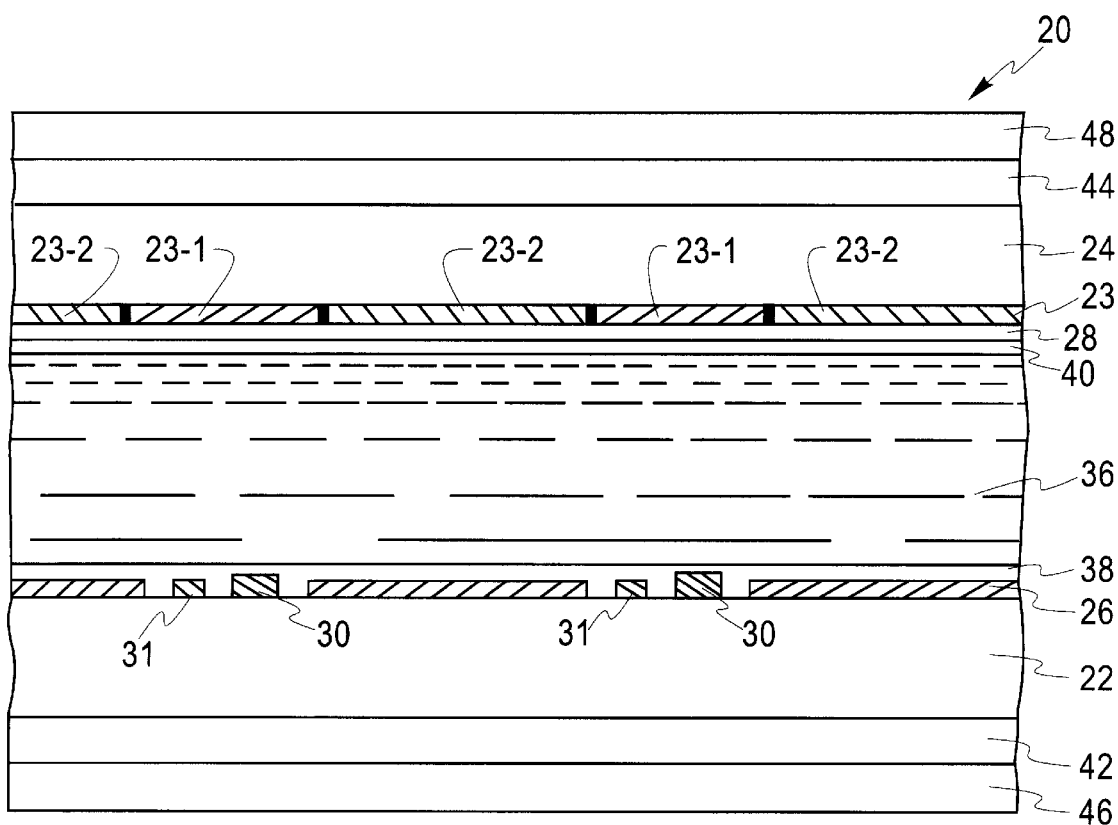
FIG. 2 illustrates a partial cross section (A—A) of the liquid crystal display device of FIG. 1.

FIG. 2 illustrates a partial cross-section of the conventional liquid crystal display device of FIG. 1. The device includes a first substrate 22 and a second substrate 24 formed of a transparent material such as glass. The two substrates are arranged so as to be parallel to one another with a high degree of precision. Typically, the substrates 22, 24 are separated from one another by a distance of approximately one to twenty microns, and are sealed at their edges (not shown) so as to define a closed interior space there between. The first substrate 22 has deposited thereon an array of pixel electrodes 26 which define pixels of the liquid crystal display. Also formed on substrate 22 in selected areas not having electrode films deposited thereon are semiconductor devices such as diodes or thin film transistors (TFTs) 30. As is well known in the art, there are one or more TFTs 30 for each pixel. TFTs 30 are each controlled by a conductive gate line 32 (not shown) and a conductive data line 31, which are typically deposited on substrate 22 in a manner so as not to be electrically connected to electrodes 26 except that the source of each TFT 30 is electrically connected to one respective electrode 26. Gate lines 32 (not shown) and data lines 31 are also electrically insulated from one another at crossover regions. The second substrate 24 typically has deposited thereon a color matrix layer 23. The color matrix layer 23 typically has a black matrix material 23-1 interleaved with R, G, or B color matrix material 23-2. The black matrix material 23-1 is disposed opposite the TFTs 30, data line 31 and gate line 32 (not shown) in order to block the devices from ambient incident light and prevent light leakage through outside the pixel area. The color matrix material 23-2 is disposed opposite the pixel electrode 26. In addition, a continuous electrode 28 is typically formed on the color matrix layer 23. The continuous electrode 28 is preferably formed of a thin transparent layer of a conductive material, such as indium tin oxide (ITO) or other suitable material.

A liquid crystal material 36 fills the space between substrates 22 and 24. The nature of the material depends on the mode of operation of liquid crystal display 20, as will be more fully explained below.

The interior surfaces of the liquid crystal display may be coated with respective alignment layers 38 and 40 to provide boundary conditions for the molecules of liquid crystal material 36.

The exterior surfaces of substrates 22 and 24 may have respective optical compensating films 42 and 44 disposed thereon. Finally, respective polarizing films 46 and 48 may be applied over compensation films 42 and 44 (if compensating films are used), respectively, or applied over substrate 22 and 24 (if compensating films are not used), respectively.

Conventional liquid crystal displays of the type illustrated in FIG. 2 are illuminated by a light source (not shown) that is located below the panel (the substrate 22 side) and viewed from above the panel (the substrate 24 side).

Liquid crystal cells typically are characterized by a pixel area and cell gap. The pixel area of a given cell is defined by the width W and the length L of the pixel electrode pattern of the cell as illustrated in FIG. 1. In addition, the cell gap is defined by the distance between the alignment layers 38,40 as shown in FIG. 2.

Figure 3A:
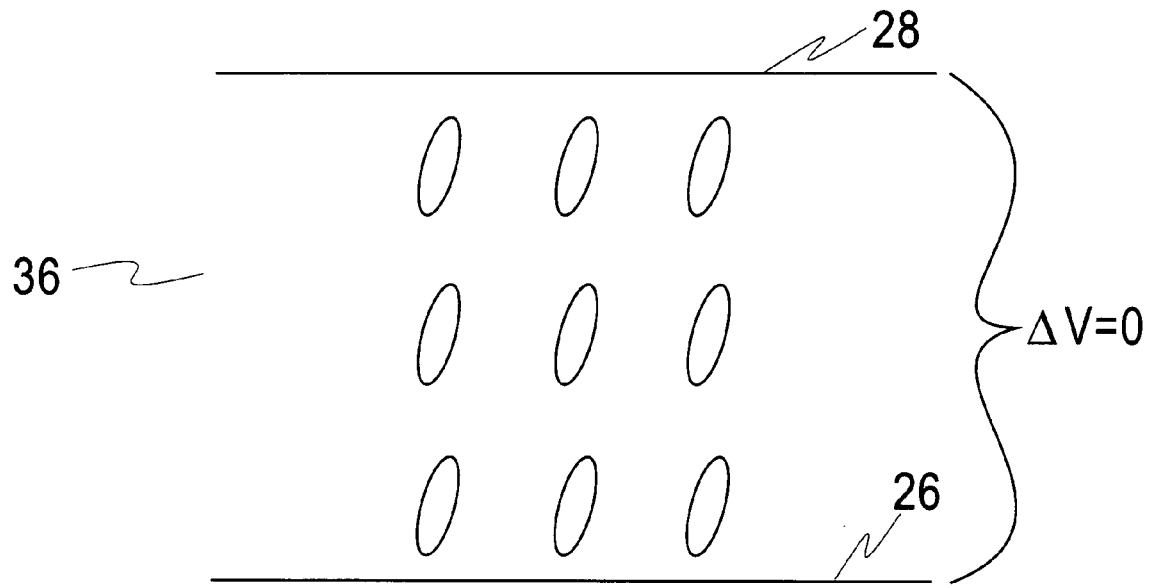
FIGS. 3(A) and (B) illustrate the orientation of LC molecules in a homeotropic liquid crystal cell.
Figure 3B:
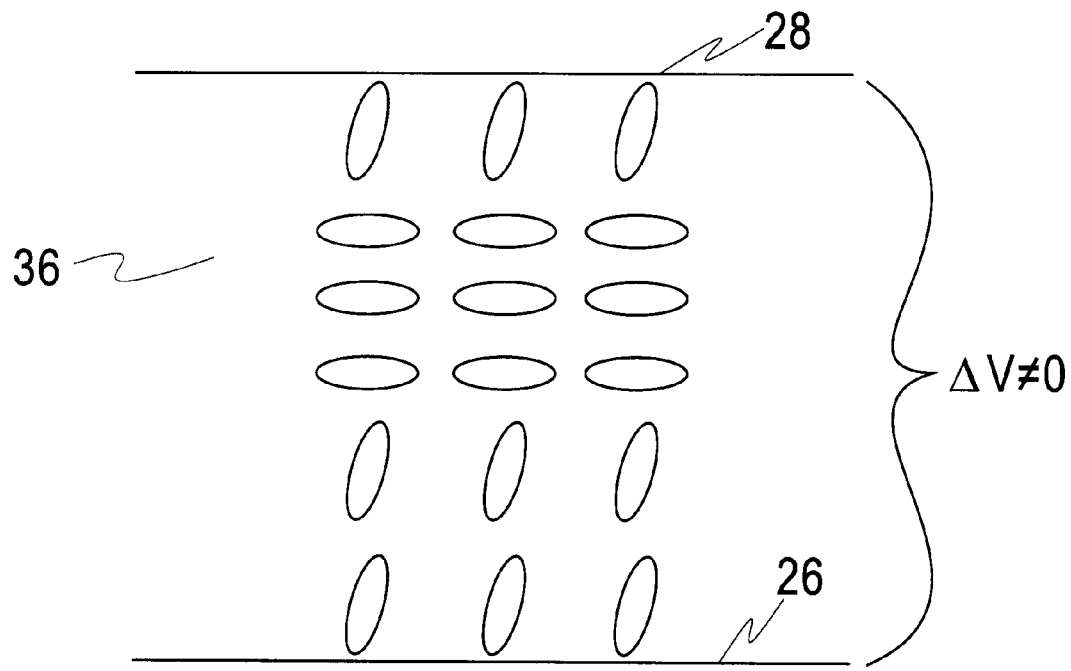

As illustrated in FIG. 3(A), in the case of a homeotropic type LCD liquid crystal (LC) molecules near the electrodes 26, 28 are aligned so that the long axes of the LC molecules are almost perpendicular to the electrode surfaces when no electric field is applied between the pixel electrode 26 and the electrode 28. The molecules have a small pretilt angle, typically one to fifteen degrees of tilt, away from the substrate normal. As illustrated in FIG. 3(B), when an electric field is applied between the electrodes 26,28 of the homeotropic liquid crystal display cell, the molecules are caused to be oriented in a direction substantially perpendicular to the electric field.

Homeotropic liquid crystal cells require a liquid crystal material that exhibits negative dielectric anisotropy, such as ZLI-4788 or ZLI-2857 manufactured by E. Merck Darmstadt of Germany and available in the United States through EM Industries. The alignment of the LC molecules of the homeotropic cells is typically provided by rubbing alignment layers 38, 40. An example of such rubbing steps is described in K. W. Lee et al., "Microscopic Molecular Reorientation of Alignment Layer Polymer Surfaces Induced by Rubbing and its Effects on LC Pretilt Angles", Macromolecules, Vol. 29, Number 27, Pages 8894–8899. The alignment layers may be formed, for example, from polyimide SE-1211 manufactured by Nissan.

As is well known in the art, homeotropic cells typically use a compensating film to reduce dark state light leakage for light that travels through the liquid crystal display panel in a direction other than perpendicular to the substrates. For best results, the product of the thickness of the liquid crystal material layer in the liquid crystal display cell and the difference between the extraordinary and ordinary indexes of refraction for the liquid crystal display material is equal to or close to the product of the total thickness of the compensating films and the difference between the ordinary and extraordinary indexes of refraction of the compensating film. It is understood by those skilled in the art that other cell configurations may be used.

According to one aspect of the present invention, at least one thin electrode wall is formed on either the pixel electrode 26 or the electrode 28 of the homeotropic liquid crystal display cell (or on both the pixel electrode 26 and the electrode 28 of the liquid crystal display cell). In the case that the thin electrode wall is formed on the pixel electrode 26, the alignment layer 38 is formed on both the pixel electrode 26 and the thin electrode wall(s). In the case that the thin electrode wall is formed on the electrode 28, the alignment layer 40 is formed on both the electrode 28 and the thin electrode wall(s). The wall(s) produces a lateral electric field that combines with the lateral electric field from the edges of the pixel electrode 26 defining the LC cell to cause the LC molecules to tilt in a desired direction when a voltage is applied across the pixel. By providing such tilt control, conventional rubbing steps associated with alignment layers can be avoided. Moreover, the geometry of the wall(s) of the cell may be configured to provide for multi-domains in the given cell.

According to another aspect of the present invention, at least one thin wall of non-conductive material may be formed on either the pixel electrode 26 or the electrode 28 of the homeotropic liquid crystal display cell (or on both the pixel electrode 26 and the electrode 28 of the liquid crystal display cell). In the case that the thin wall is formed on the pixel electrode 26, the alignment layer 38 is formed on both the pixel electrode 26 and the thin wall(s). In the case that the thin wall is formed on the electrode 28, the alignment layer 40 is formed on both the electrode 28 and the thin wall(s). The slope of the side walls of the thin wall dictates the slope of the respective alignment layer formed on the thin wall. For the LC molecules near the wall(s), the slope of the side walls/alignment layer(s) causes the LC molecules near the wall(s) to tilt in a desired direction either when a voltage is applied across the pixel or when a voltage is not applied across the pixel. For the LC molecules away from the thin wall(s), the slope of the side walls/alignment layer (s) and the lateral electric field from the edges of the pixel electrode 26 defining the LC cell cause the LC molecules away from the thin wall(s) to tilt in a desired direction when a voltage is applied across the pixel. By providing such tilt control, conventional rubbing steps associated the alignment layers can be avoided. Moreover, the geometry of the wall(s) of the cell may be configured to provide for multi-domains in the given cell.

Figure 6A:
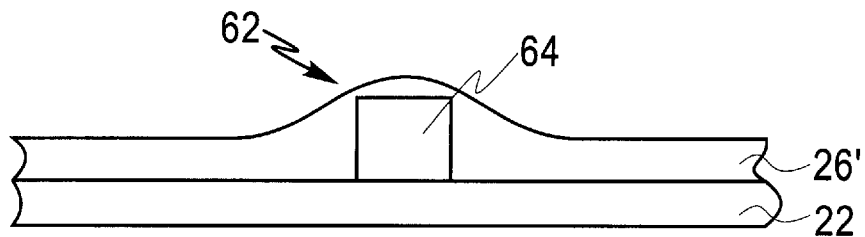
FIGS. 6(A)–(F) illustrate various structures of the wall to be used for various embodiments of liquid crystal cells according to the present invention.

An embodiment of the present invention is illustrated in FIGS. 5 and 6(A) wherein a thin electrode wall 62 is formed on the first substrate 22. In this embodiment, the electrode wall 62 is formed by forming a step 64 on the substrate 22. The step 64 is preferably a transparent material such as XP-9595 Photoimageable LCD Top Coat available from Shipley Co. of Marlborough, Mass., clear resin CTS-118 commercially available from Olin Microelectronic Materials of East Providence, R.I., silicon oxide or other suitable material. The step 64 preferably has steep side walls which may be formed, for example, by directional reactive ion etching techniques or suitable wet etching techniques. The pixel electrode layer 26' is then formed on step 64 and on the first substrate 22 above the pixel area of the cell. In this embodiment, the electrode wall 62 of the present invention is formed by the step 64 and the pixel electrode layer 26'. The electrode wall 62 produces a lateral electric field that combines with the lateral electric field from the edges of the pixel electrode 26 defining the LC cell to cause the LC molecules to tilt in a desired direction when a voltage is applied across the pixel. By providing such tilt control, conventional rubbing steps associated with alignment layers can be avoided. Moreover, the geometry of the wall(s) of the cell may be configured to provide for multi-domains in the given cell as described in more detail below.

Figure 6B:
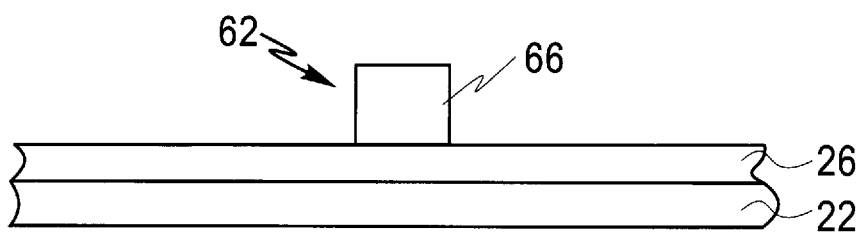

An alternate embodiment of the present invention is illustrated in FIGS. 5 and 6(B) wherein a thin electrode wall 62 is formed on the first substrate 22. In this embodiment, the electrode wall 62 is formed by forming the pixel electrode 26 on the first substrate 22 and then forming a step 66 of conductive material on the pixel electrode 26. The step 66 preferably comprises a transparent conductive material such as a conductive polymer. The step 66 preferably has steep side walls which may be formed, for example, by directional reactive ion etching techniques or suitable wet etching techniques. In this embodiment, the electrode wall 62 of the present invention is formed by the pixel electrode layer 26 and the step 66. The electrode wall 62 produces a lateral electric field that combines with the lateral electric field from the edges of the pixel electrode 26 defining the LC cell to cause the LC molecules to tilt in a desired direction when a voltage is applied across the pixel. By providing such tilt control, conventional rubbing steps associated with alignment layers can be avoided. Moreover, the geometry of the wall(s) of the cell may be configured to provide for multi-domains in the given cell as described in more detail below.

Figure 6C:
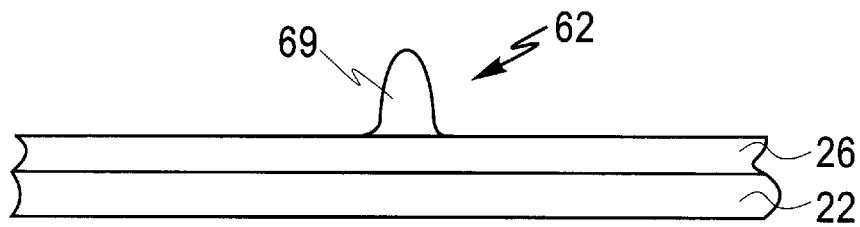
Figure 6D:
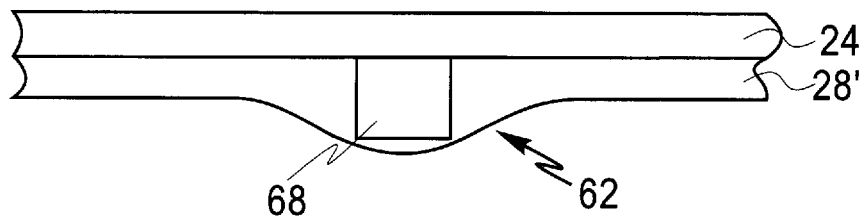
Figure 6E:
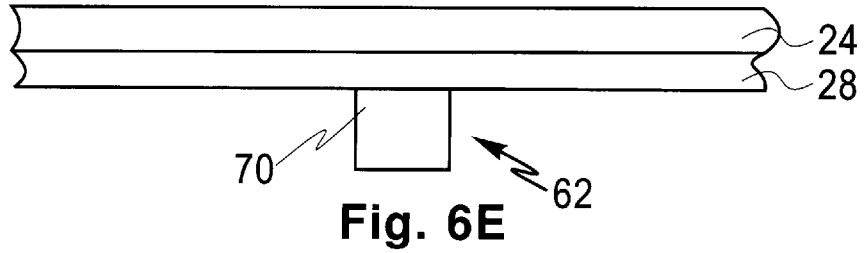
Figure 6F:
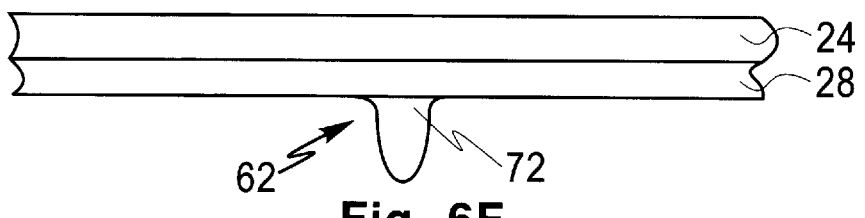

An alternate embodiment of the present invention is illustrated in FIGS. 5 and 6(F) wherein the non-conductive wall 62 is formed on the second substrate 24. In this embodiment, the transparent conductive electrode 28 is formed on the second substrate 24. A step 72 of transparent non-conductive material is then formed on the transparent conductive electrode 28. The step 72 is preferably a transparent material such as XP-9595 Photoimageable LCD Top Coat available from Shipley Co. of Marlborough, Mass., clear resin CTS-118 commercially available from Olin Microelectronic Materials of East Providence, R.I., silicon oxide or other suitable material. The step 72 preferably has sloped side walls which may be formed, for example, by wet etching techniques. The alignment layer 40 is formed on the electrode 28 and the step 72. The slope of the side walls of the step 72 dictates the slope of the alignment layer 40 formed on the step 72. In this embodiment, the non-conductive thin wall 62 of the present invention is formed by the step 72. The slope of the side walls/alignment layer causes the LC molecules near the side walls of the step 72 to tilt in a desired direction either when a voltage is applied across the pixel or when a voltage is not applied across the pixel. The slope of the side walls/alignment layer and the lateral electric field from the edges of the pixel electrode 26 defining the LC cell cause the LC molecules away from the side walls of the step 72 to tilt in a desired direction when a voltage is applied across the pixel. By providing such tilt control, conventional rubbing steps associated with alignment layers can be avoided. Moreover, the geometry of the wall(s) of the cell may be configured to provide for multi-domains in the given cell as described in more detail below.

One skilled in the art will recognize that other embodiments may be used. For example, the wall 62 may formed on the first substrate 22 as shown in FIGS. 6(A) or 6(B) and formed on the second substrate 24 as shown in FIG. 6(F). In another example, the wall 62 may formed on the second substrate 24 as shown in FIGS. 6(D) or 6(E) and/or formed on the first substrate 22 as shown in FIG. 6(C).

In order to create a 2-domain cell, the wall 62 of the present invention as described above with respect to FIGS. 6(A)–(F) is preferably disposed near the middle of the pixel area of the cell as shown in FIG. 5. In this configuration, one domain D1 is disposed to the left of the electrode wall 62 and the other domain D2 is disposed to the right of the electrode wall 62.

The height of the wall 62 is preferably ⅕ to ⅘ of the cell gap of the liquid crystal display cell. The width of the wall 62 is preferably less than 3 times the cell gap of the liquid crystal cell, It is important to note that the performance of the cell is improved by shrinking the width of the wall 62; however, such width is typically limited by photolithographical limitations.

Figure 7:
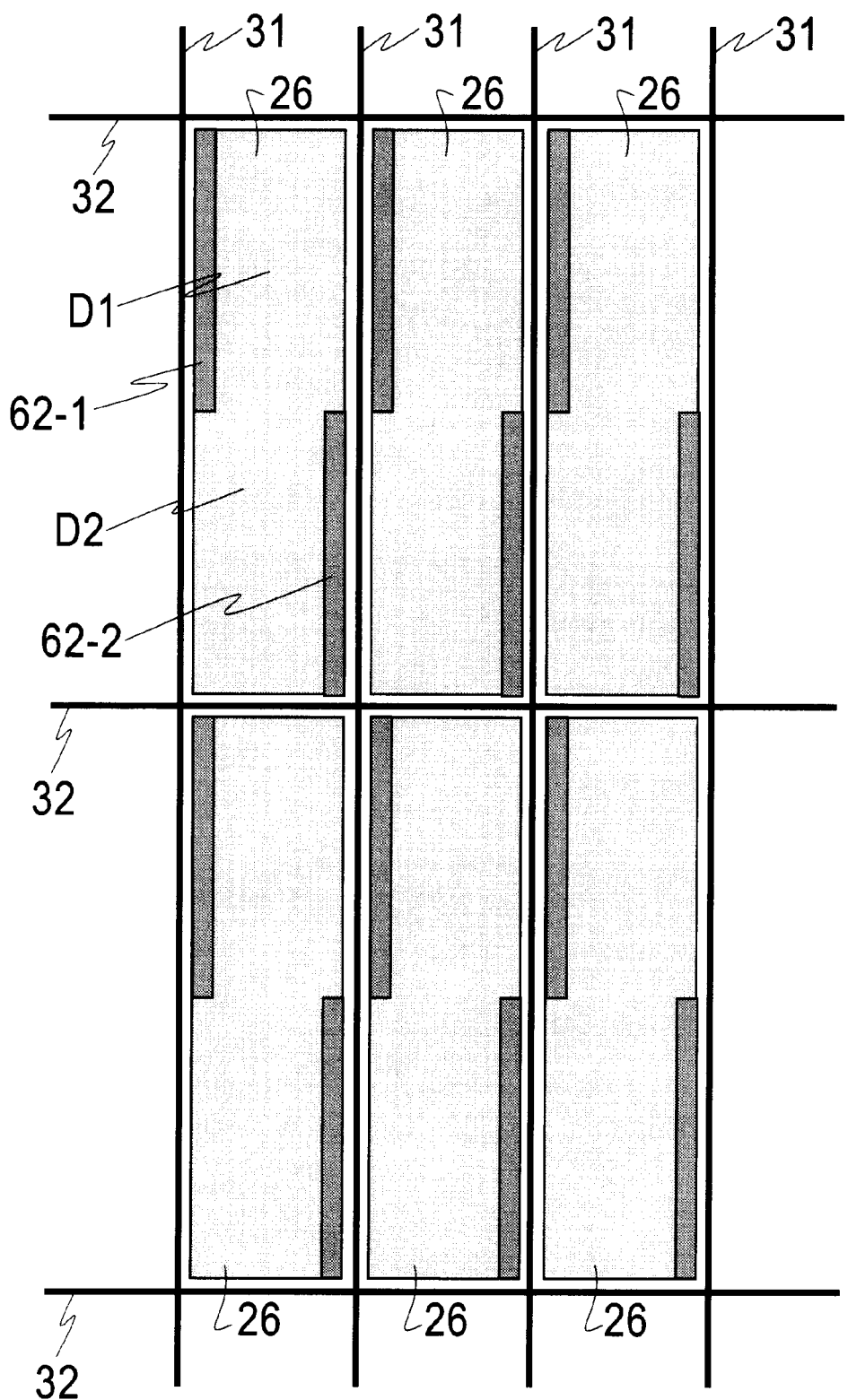
Figure 9:
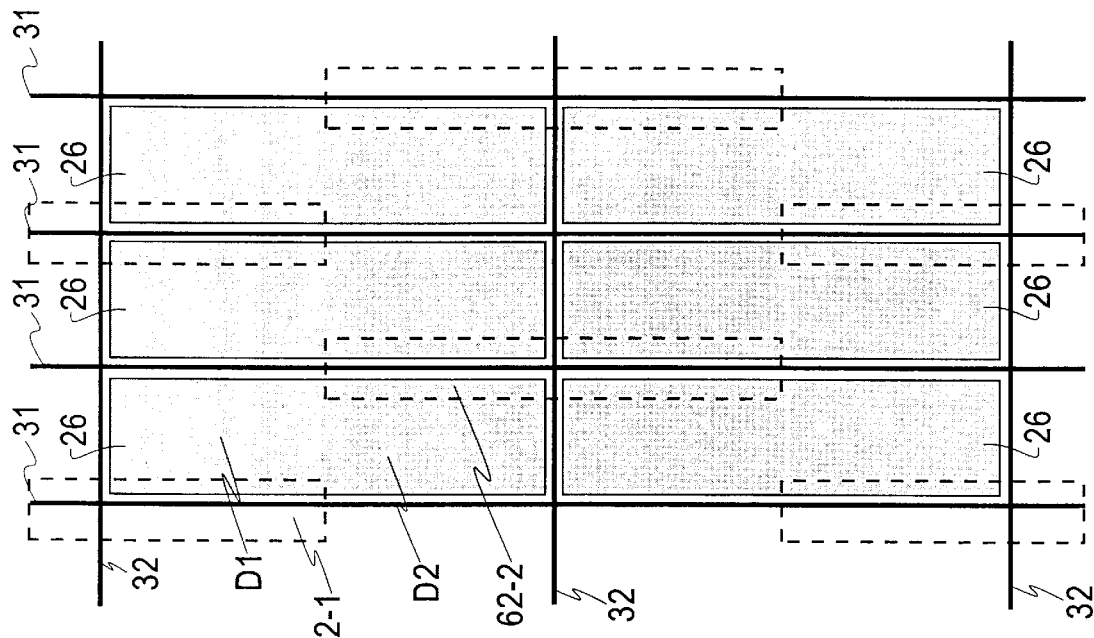
Figure 8:
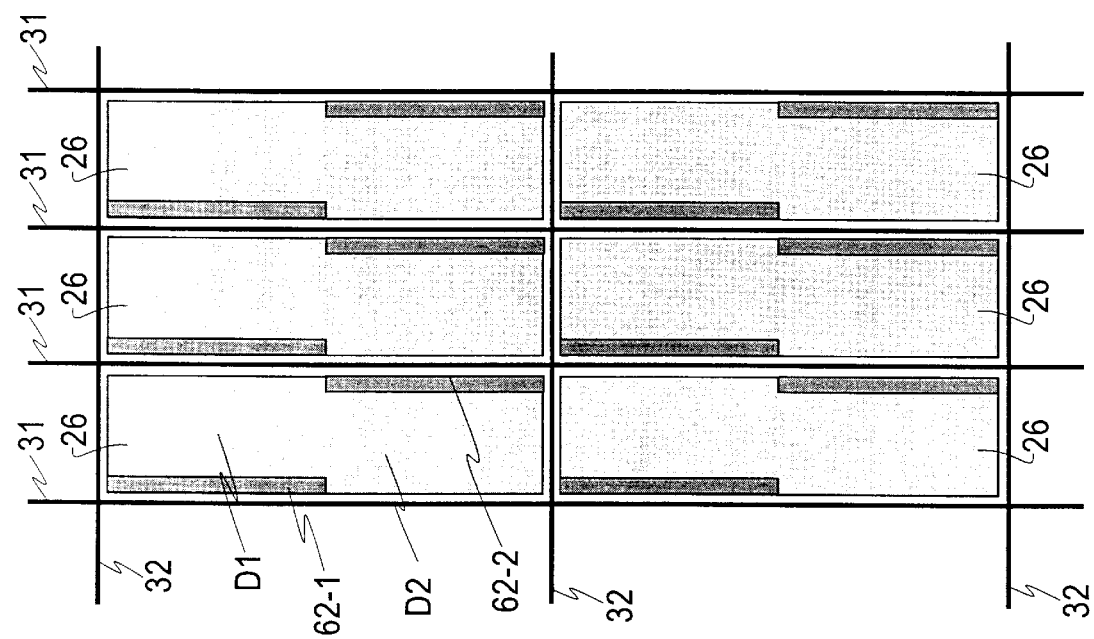

Alternate rectangular cell designs utilizing the wall(s) of the present invention are illustrated in FIGS. 7–11. As illustrated in FIGS. 7–9, each cell may include two walls. In FIG. 7, each cell has a common configuration. More specifically, one of the walls 62-1 is disposed near the left edge in the upper portion of the cell, and the other wall 62-2 is disposed near the right edge in the lower portion of the cell. In this configuration, each cell is divided into two domains: domain D1 to the right of the wall 62-1, and domain D2 to the left of the wall 62-2. For FIG. 7, electrode wall structure of FIGS. 6(A) and 6(B) but with electrode wall located near the edge of the pixel can be used for electrode walls 62-1 and 62-2. Also, non-conductive structure of FIG. 6(F) but with wall located near the edge of the pixel can be used for non-conductive walls 62-1 and 62-2.

In FIGS. 8 and 9, adjacent cells are configured differently. More specifically, for the left cell of a pair of cells, one of the walls 62-1 is disposed near the left edge in the upper portion of the left cell, and the other wall 62-2 is disposed near the right edge in the lower portion of the left cell. For the right cell of the pair, one of the walls 62-1 is disposed near the left edge in the bottom portion of the right cell, and the other wall 62-2 is disposed near the right edge in the upper portion of the right cell. In this configuration, the cells are divided into 2-domains as follows: the upper portion of the left cell has a first domain D1, the lower portion of the left cell has a second domain D2, the upper portion of the right cell has the domain D2, and the lower portion of the right cell has the first domain D1.

FIG. 8 illustrates the electrode walls 62-1,62-2 formed as discussed above with respect to FIGS. 6(B) wherein each electrode wall is formed by the pixel electrode layer 26 and a step 66 of conductive material. In this case, the electrode walls 62-1,62-2 of each cell is preferably distinct to provide for independent control of the cells. The structure of FIG. 6(A) wherein each electrode wall is formed by the step 64 and the pixel electrode 26' can also be used for FIG. 8. Furthermore, the structure of FIG. 6(F) wherein each non-conductive wall is formed by the pixel electrode 28 and the step 64 can also be used for FIG. 8.

FIG. 9 illustrates the walls 62-1,62-2 formed as discussed above with respect to FIGS. 6(A) or 6(F). In this case, portions of the walls 62-1,62-2 may be continuous across one or more cells. More specifically, if the electrode walls 62-1,62-2 are formed as discussed above with respect to FIG. 6(A), the step 64 of transparent material may be continuous across adjacent cells. If the non-conductive walls 62-1, 62-1 are formed as discussed above with respect to FIG. 6(F), the step 72 may be continuous across adjacent cells.

FIG. 10 illustrates the walls 62-1,62-2 formed as discussed above with respect to FIGS. 6(A) or 6(F), the walls 63-1,63-2 formed as discussed above with respect to FIGS. 6(D) or 6(C). In this case, portions of the walls 62-1,62-2, 63-1, 63-2 may be continuous across one or more cells. More specifically, if the electrode walls 62-1,62-2 are formed as discussed above with respect to FIG. 6(A) and the electrode walls 63-1,63-2 are formed as discussed above with respect to FIG. 6(D), the step 64 of transparent material of the walls 62-1,62-2 may be continuous across adjacent cells (the step 64 of transparent material of wall 62-2 is shared by the four adjacent cells labeled A,B,D,E), and the step 68 of transparent material of the walls 63-1,63-2 may be continuous across adjacent cells (the step 68 of transparent material of wall 63-1 is shared by the four adjacent cells labeled B,C,E,F). Similarly, if the non-conductive walls 62-1, 62-1 are formed as discussed above with respect to FIG. 6(F) and non-conductive walls 63-1, 63-1 are formed as discussed above with respect to FIG. 6(C), the step 72 and 69 of transparent material of the walls may be continuous across adjacent cells as shown.

As illustrated in FIG. 11, the electrode wall 62 may have a branched configuration wherein a plurality of branches are interconnected to one another. In this example, the branched configuration is a y-inverse-y configuration which provides for a cell having 4 domains. A more detailed description of such a double-y configuration is set forth in U.S. Pat. No. 5,309,264, commonly assigned to the assignee of the present invention, herein incorporated by reference in its entirety. In this example, the branches of the electrode wall 62 may be formed as discussed above with respect to FIGS. 6(A), 6(B) and 6(F).

Figure 13:
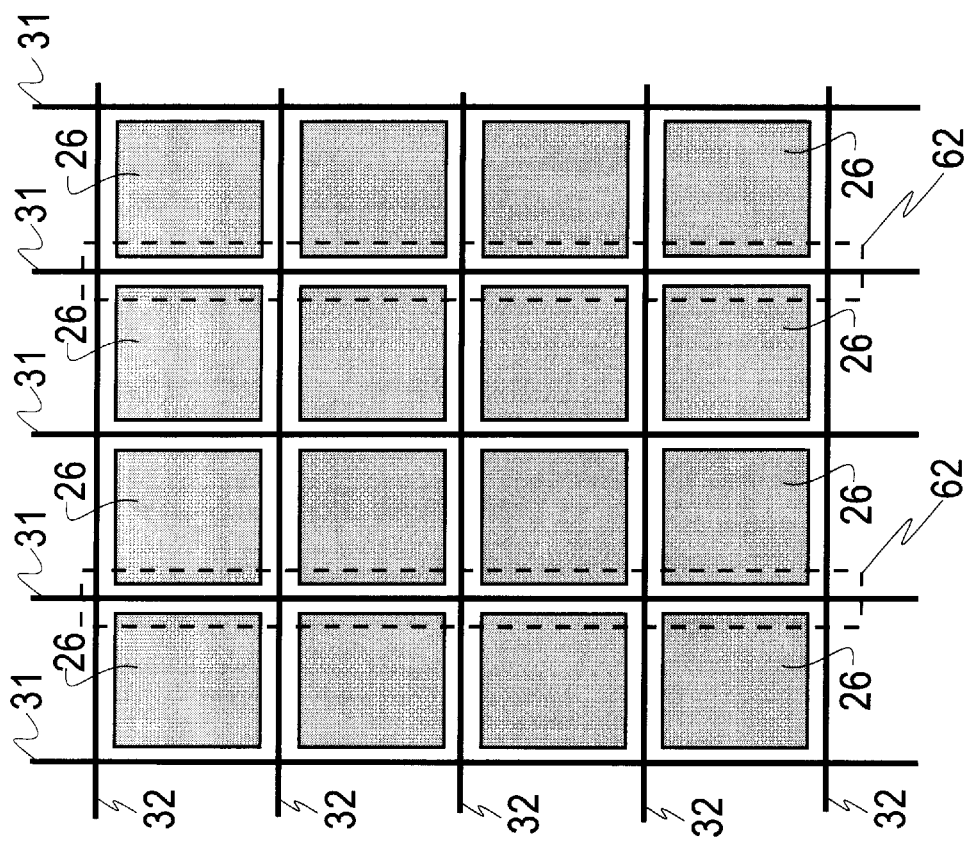
Figure 12:
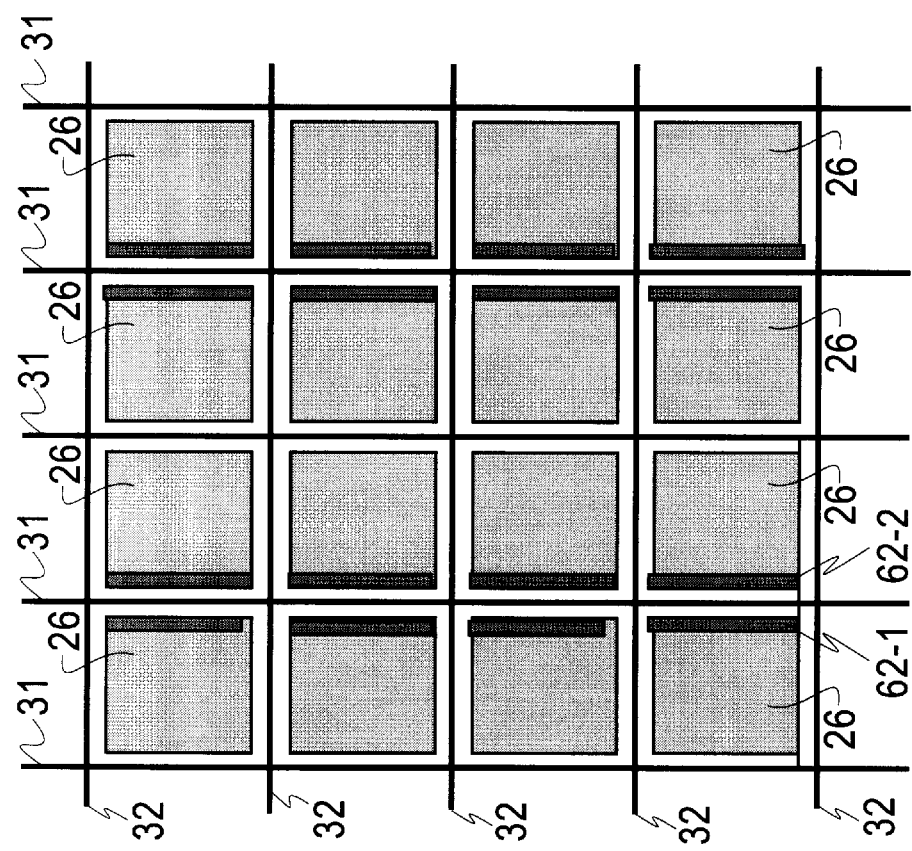

Alternate square cell designs utilizing the walls of the present invention are illustrated in FIGS. 12–15. The cell of FIG. 12 is a single domain cell with an electrode wall similar to the wall described above with respect to 8. The cell of FIG. 13 is a single domain cell with an electrode wall similar to the wall described above with respect to 9. The cell of FIG. 14 is similar to the cell described above with respect to FIG. 10. The cell of FIG. 15 is similar to the cell described above with respect to FIG. 11. In this example, the branched configuration is an X configuration, which provides for a cell having 4 domains.

Figure 17:
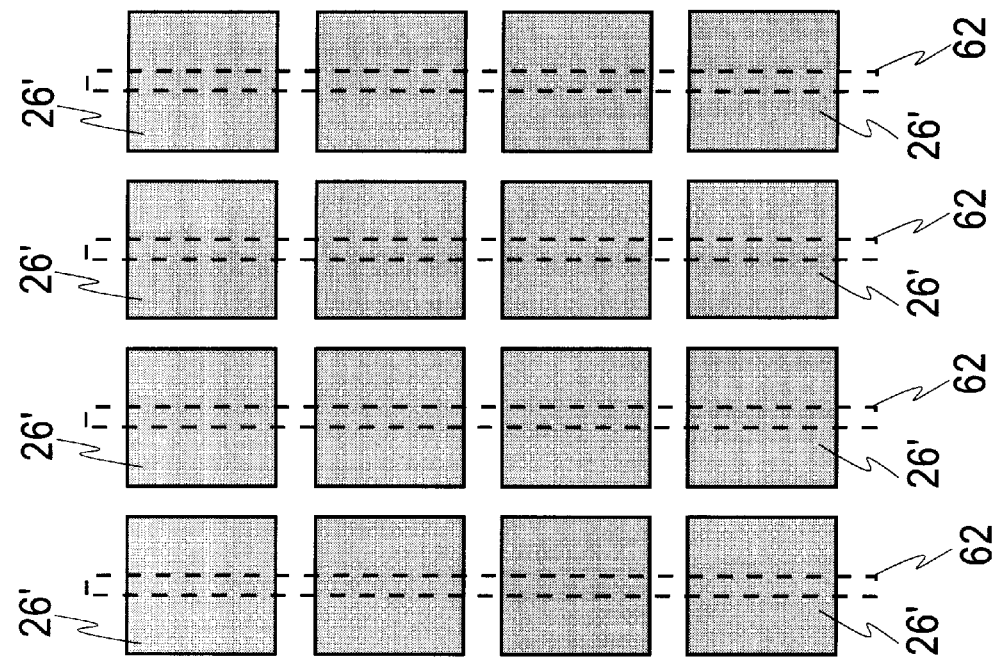
FIG. 16 to FIG. 18 illustrate configurations of the wall for various embodiments of reflective homeotropic liquid crystal cells with square pixel cells.
Figure 16:
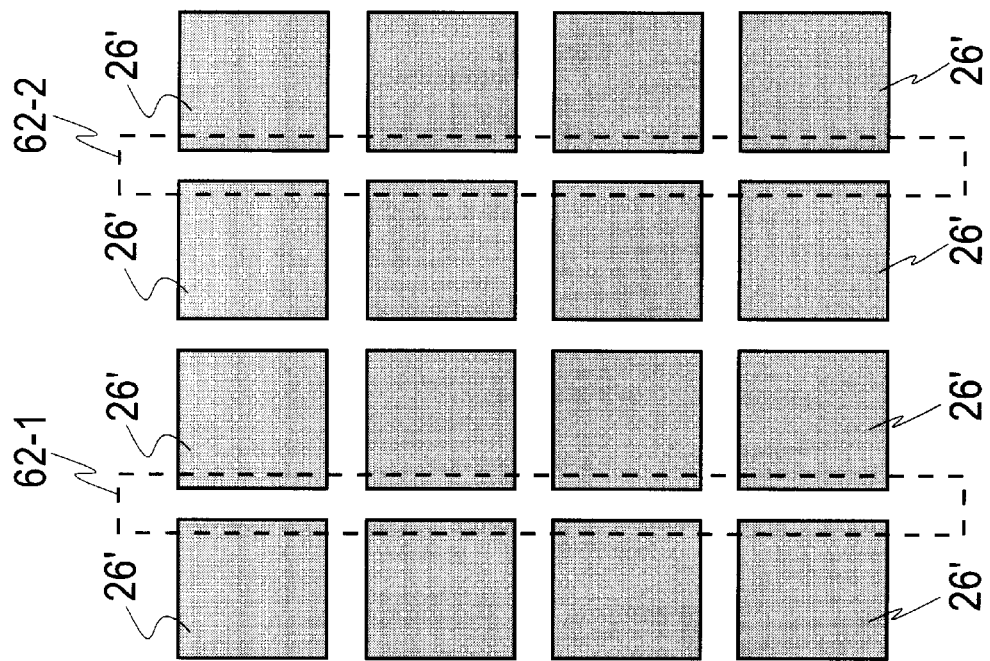
Figure 18:
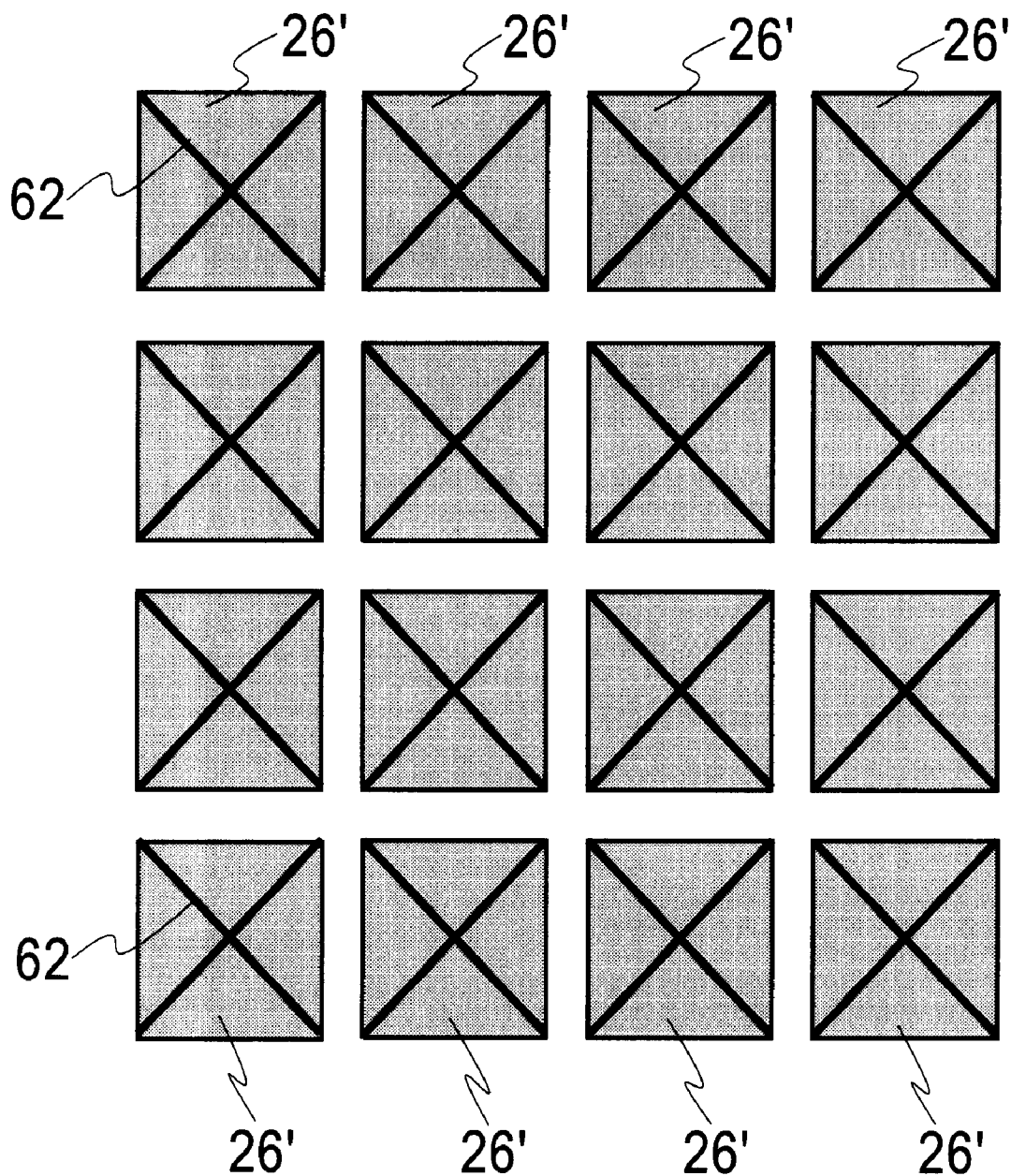

The wall of the present invention may be used in reflective-type liquid crystal display device. In this type of device, a reflective pixel electrode 26' is disposed on the first substrate 22. In this case, the wall may be integrated into the reflective electrode 26' disposed on the first substrate 22 and/or integrated into the transparent electrode layer 28 disposed on the second substrate 24. For the reflective liquid crystal display, either direct view or projection, the bus lines are buried beneath the pixel electrodes 26' to maximize the aspect ratio. The square cell designs with electrode walls are illustrated in FIGS. 16–18. The cell of FIG. 16 is a single domain cell with an electrode wall similar to the wall described above with respect to 9. The cell of FIG. 17 is a two domain cell with an electrode wall similar to the wall described above with respect to FIG. 5. The cell of FIG. 18 is similar to the cell described above with respect to FIG. 11. In this example, the branched configuration is an X configuration, which provides for a cell having 4 domains.

FIG. 16 illustrates a reflective liquid crystal cell array structure that may be used with a frame inversion driving scheme or a two line column inversion driving scheme. In the frame inversion driving scheme, during a first frame interval, all pixels of the array are driven with a signal having the same polarity. Then, during the next subsequent frame interval, all the pixels of the array are driven with a signal having an opposite polarity with respect to the first frame interval. In the two line column inversion driving scheme, the pixels in a first set of adjacent columns (which share a common thin wall 62-1) are driven with a signal having the same polarity. The pixels in a second set of adjacent columns (which share a common thin wall 62-2) are driven with a signal having an opposite polarity with respect to the pixels of the first set.

FIG. 17 illustrates a reflective liquid crystal cell array structure that may be used with a frame inversion driving scheme or a one line column inversion driving scheme. The frame inversion driving scheme is described above with respect to FIG. 16. In the one line column inversion driving scheme, the pixels in one column (which share a common thin wall 62) are driven with a signal having the same polarity. The pixels of the adjacent column (which also share a common thin wall 62) are driven with a signal having an opposite polarity.

FIG. 18 illustrates a reflective liquid crystal cell array structure that may be used with a frame inversion driving scheme or a dot inversion driving scheme. The frame inversion driving scheme is described above with respect to FIG. 16. In the dot inversion driving scheme, adjacent pixels are driven with signals of opposite polarity.

For the reflective display, step 64 of FIG. 6(A) need not be formed from a transparent material, since it is covered by the reflective not transparent electrode 26'. It is understood by those skilled in the art that cell designs for the reflective display with rectangular shape can easily be constructed similar to FIGS. 5 and 7–11.

Figure 4A:
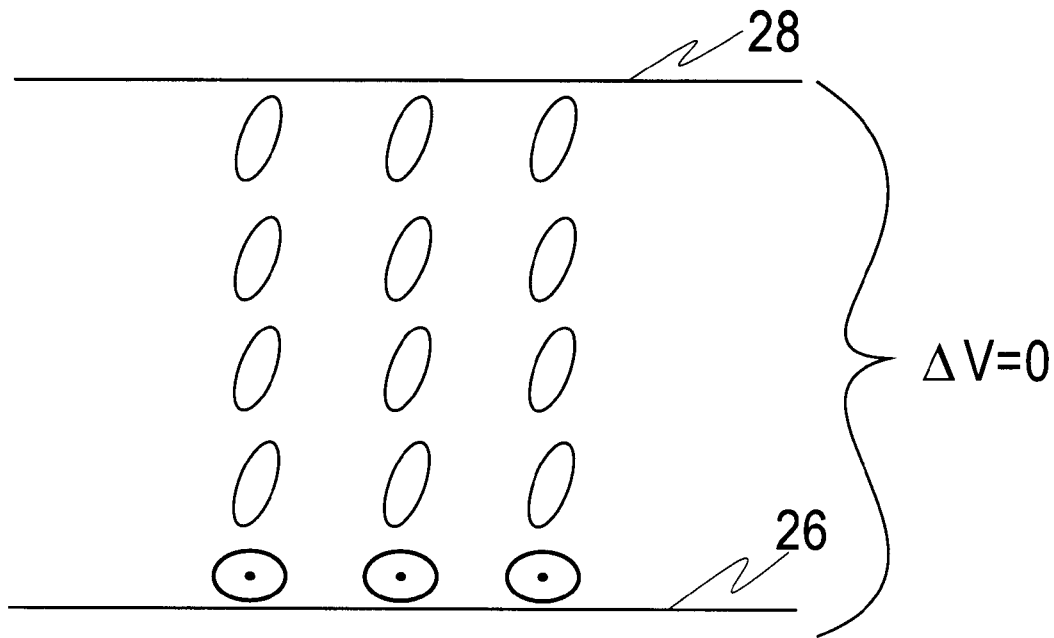
FIGS. 4(A) and (B) illustrate the orientation of LC molecules in a twisted nematic liquid crystal cell.
Figure 4B:
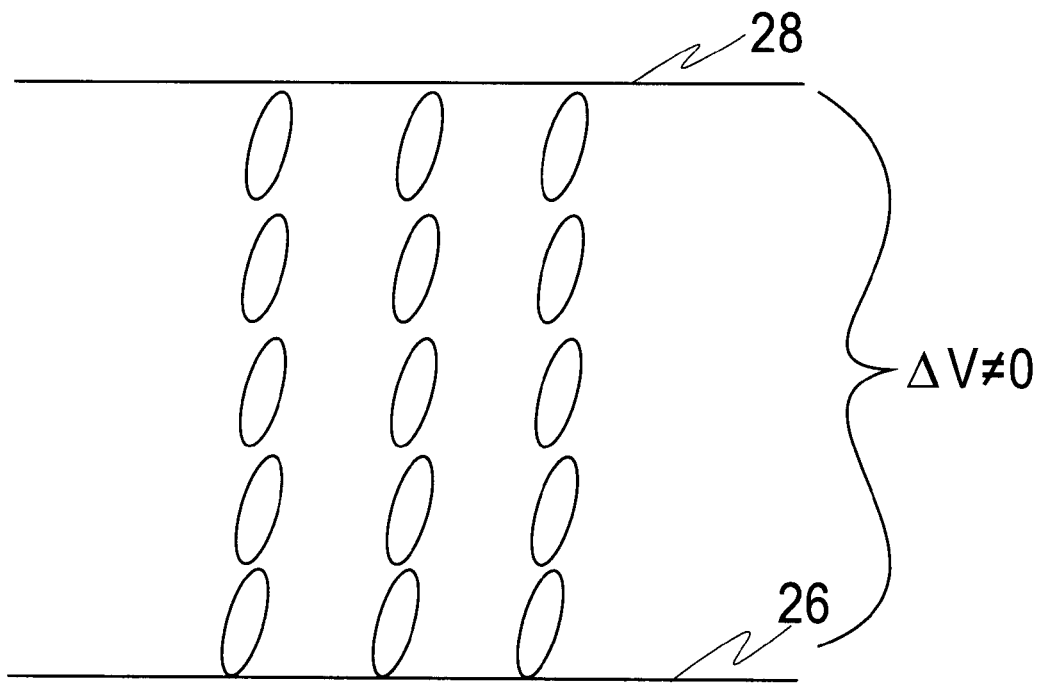

FIG. 4(A) illustrates homogenous LC cells (also referred to as twisted nematic type cells). In this case, LC molecules near the boundary of the electrode surfaces 22, 24 are aligned such that the long axes of the LC molecules are almost parallel to the electrode surfaces when no electric field is applied between the pixel electrode 26 and the electrode 28. Moreover, the LC molecules near the border of the pixel electrode 26 (pointing into the page as shown in FIG. 4(A)) are rotated, typically 90 degrees, with respect to the LC molecules near the opposite electrode 28. The molecules typically have a small pretilt angle (one to five degrees of tilt) away from the electrode surfaces. As illustrated in FIG. 4(B), when an electric field is applied between the electrodes 26, 28 of the twisted nematic liquid crystal display cell, the molecules are caused to be oriented in a direction substantially parallel to the electric field.

Twisted nematic liquid crystal cells may use a liquid crystal material that exhibits positive dielectric anisotropy, such as ZLI-4792 manufactured by E. Merck Dannstadt of Germany and available in the United States through EM Industries. The alignment of the LC molecules of the twisted nematic cells is typically provided by rubbing alignment layers 38, 40. An example of such rubbing steps is described in K. W. Lee et al., "Microscopic Molecular Reorientation of Alignment Layer Polymer Surfaces Induced by Rubbing and its Effects on LC Pretilt Angles", Macromolecules, Vol. 29, Number 27, Pages 8894–8899. The alignment layers may be formed, for example, from polyimide SE-5291 manufactured by Nissan.

The exterior surfaces of substrates 22 and 24 may, with some liquid crystal displays, have respective optical compensating films 42 and 44 disposed thereon. Finally, polarizing films 46 and 48 may be applied over compensation films 42 and 44 (if compensating films are used), respectively, or applied over substrate 22 and 24 (if compensating films are not used), respectively.

It is understood by those skilled in the art that other cell configurations may be used. The cells may be normally white or normally black or operating in an e-mode or o-mode. Right-hand twist or left-hand twist may be used. Finally, in general, a twist angle anywhere between 0 degrees and 360 degrees may be used.

According to one aspect of the present invention, at least one thin electrode wall may be formed on either the pixel electrode 26 or the electrode 28 of the homogenous liquid crystal display cell (or on both the pixel electrode 26 and the electrode 28 of the liquid crystal display cell). In the case that the thin electrode wall is formed on the pixel electrode 26, the alignment layer 38 is formed on both the pixel electrode 26 and the thin electrode wall(s). In the case that the thin electrode wall is formed on the electrode 28, the alignment layer 40 is formed on both the electrode 28 and the thin electrode wall(s). The wall(s) produces a lateral electric field that combines with the lateral electric field from the edges of the pixel electrode 26 defining the LC cell to cause the LC molecules to tilt in a desired direction when a voltage is applied across the pixel. Moreover, the geometry of the wall(s) of the cell may be configured to provide for multi-domains in the given cell.

According to another aspect of the present invention, a thin non-conductive wall may be formed on either the pixel electrode 26 or the electrode 28 of the homeotropic liquid crystal display cell (or on both the pixel electrode 26 and the electrode 28 of the liquid crystal display cell). In the case that the thin wall is formed on the pixel electrode 26, the alignment layer 38 is formed on both the pixel electrode 26 and the thin wall(s). In the case that the thin wall is formed on the electrode 28, the alignment layer 40 is formed on both the electrode 28 and the thin wall(s). The slope of the side walls of the thin wall dictates the slope of the respective alignment layer formed on the thin wall. For the LC molecules near the wall(s), the slope of the side walls/alignment layer(s) causes the LC molecules near the wall(s) to tilt in a desired direction either when a voltage is applied across the pixel or when a voltage is not applied across the pixel. For the LC molecules away from the thin wall(s), the slope of the side walls/alignment layer(s) and the lateral electric field from the edges of the pixel electrode 26 defining the LC cell cause the LC molecules away from the thin wall(s) to tilt in a desired direction when a voltage is applied across the pixel. Moreover, the geometry of the wall(s) of the cell may be configured to provide for multi-domains in the given cell.

Figure 19:
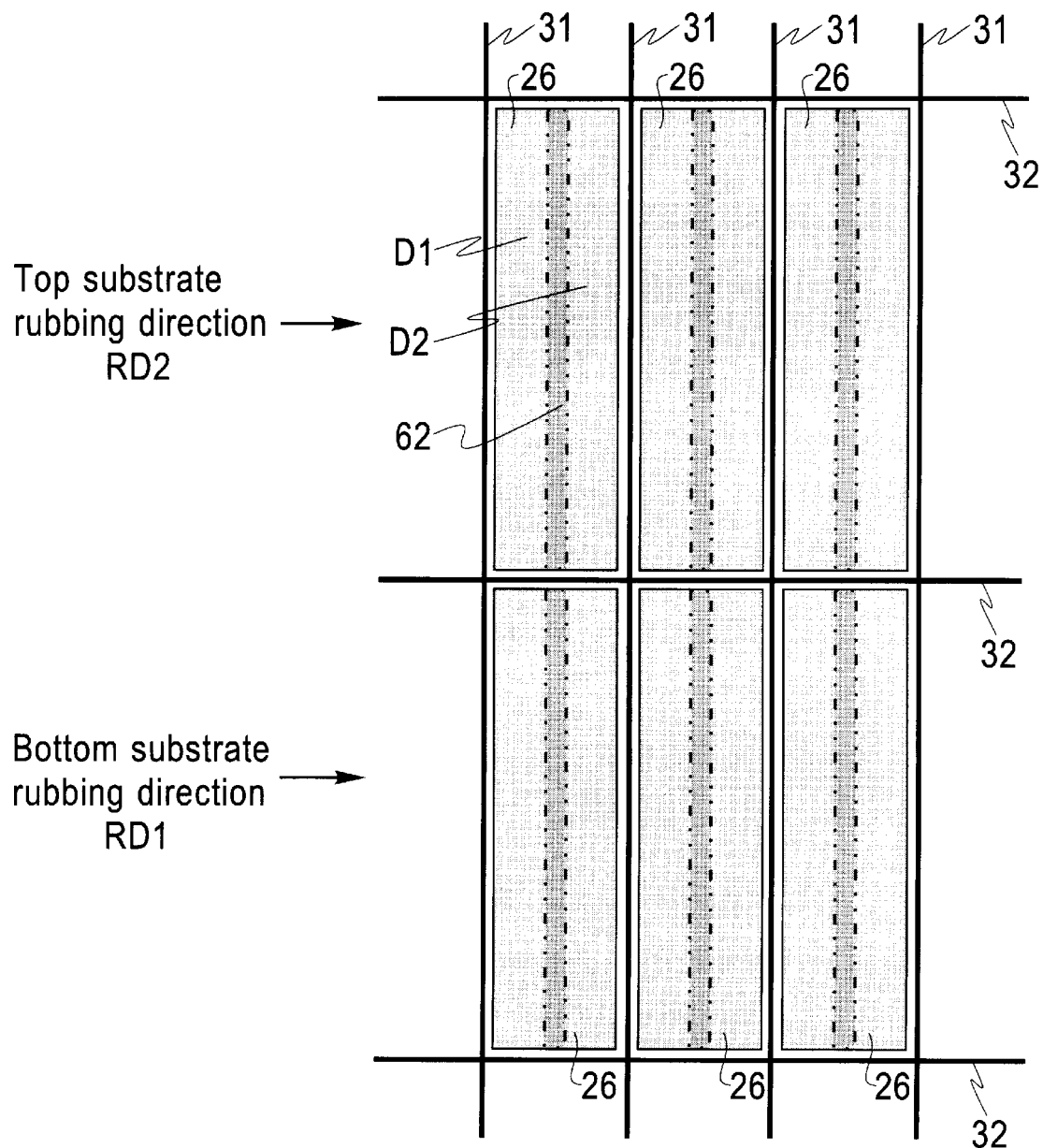
FIG. 19 and FIG. 20 illustrate configurations of the wall for various embodiments of homogenous liquid crystal cells according to the present invention.

An embodiment of the present invention is illustrated in FIGS. 19 and 6(A) wherein a thin electrode wall 62 is formed on the first substrate 22. In this embodiment, the electrode wall 62 is formed by forming a step 64 on the substrate 22. The step 64 is preferably a transparent material such as XP-9595 Photoimageable LCD Top Coat available from Shipley Co. of Marlborough, Mass., clear resin CTS-118 commercially available from Olin Microelectronic Materials of East Providence, R.I. or other suitable material. The step 64 preferably has steep side walls which may be formed, for example, by directional reactive ion etching techniques or suitable wet etching techniques. The pixel electrode layer 26' is then formed on step 64 and on the first substrate 22 above the pixel area of the cell. In this embodiment, the electrode wall 62 of the present invention is formed by the step 64 and the pixel electrode layer 26'.

In order to create a 2-domain cell, the electrode wall 62 may be disposed near the middle of the pixel area of the cell as shown in FIG. 19. In this configuration, the alignment layers are preferably rubbed in a single direction as shown. RD1 represents the rubbing direction of the bottom alignment layer 38, and RD2 represents the rubbing direction of the top alignment layer 40. In this configuration, the cells are divided into 2-domains as follows: the left portion of the cell has a first domain D1, and the right portion of the cell has a second domain D2. Advantageously, in this configuration, a single rubbing step for each substrate is used whereby the alignment layers are rubbed in a common direction. This avoids multiple rubbing steps typically required by the prior art homogenous LC cells.

One skilled in the art will recognize that other embodiments may be used wherein the electrode wall 62 is formed on the first substrate 22 as described above with respect to FIG. 6((B) or non-conductive wall 62 formed on the second substrate 24 as described above with respect to FIGS. 6(F).

Figure 20:
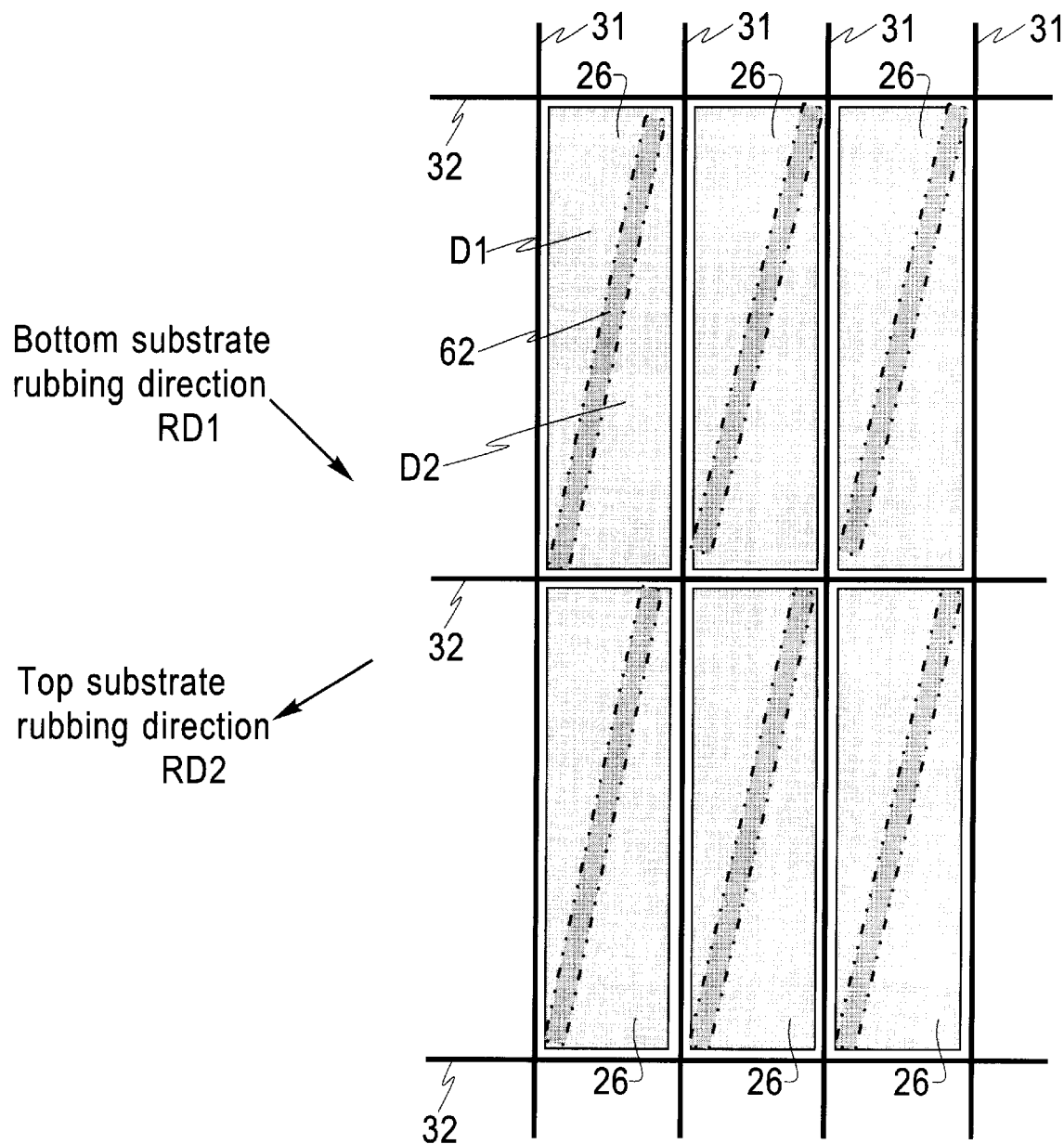

An alternate embodiment of the present invention is illustrated in FIGS. 20 and 6(A) wherein a thin electrode wall 62 is formed on the first substrate 22. In this embodiment, the electrode wall 62 is formed by forming a step 64 on the substrate 22. The step 64 is preferably a transparent material such as XP-9595 Photoimageable LCD Top Coat available from Shipley Co. of Marlborough, Mass., clear resin CTS-118 commercially available from Olin Microelectronic Materials of East Providence, R.I. or other suitable material. The step 64 preferably has steep side walls which may be formed, for example, by directional reactive ion etching techniques or suitable wet etching techniques. The pixel electrode layer 26' is then formed on step 64 and on the first substrate 22 above the pixel area of the cell. In this embodiment, the electrode wall 62 of the present invention is formed by the step 64 and the pixel electrode layer 26'.

In order to create a 2-domain cell, the electrode wall 62 may be disposed along the diagonal of the pixel area of the cell as shown in FIG. 20. In this configuration, the alignment layers are preferably rubbed in the directions RD1 and RD2 as shown. RD1 represents the rubbing direction of the bottom alignment layer 38, and RD2 represents the rubbing direction of the top alignment layer 40. (Here, a left-hand twist cell is used as an example.) In this configuration, the cells are divided into 2-domains as follows: the portion of the cell above the diagonal has a first domain D1, and the portion of the cell below the diagonal a second domain D2. In this configuration, a single rubbing step per substrate is required.

One skilled in the art will recognize that other embodiments may be used wherein the electrode wall 62 is formed on the first substrate 22 as described above with respect to FIG. 6((B) or non-conductive wall 62 formed on the second substrate 24 as described above with respect to FIGS. 6(F).

The height of the electrode wall 62 is preferably ⅕ to ⅘ of the cell gap of the liquid crystal display cell. The width of the electrode wall 62 is preferably less than 3 times the cell gap of the liquid crystal cell, It is important to note that the performance of the cell is improved by shrinking the width of the electrode wall; however, such width is typically limited by photolithographical limitations.

Figure 21:
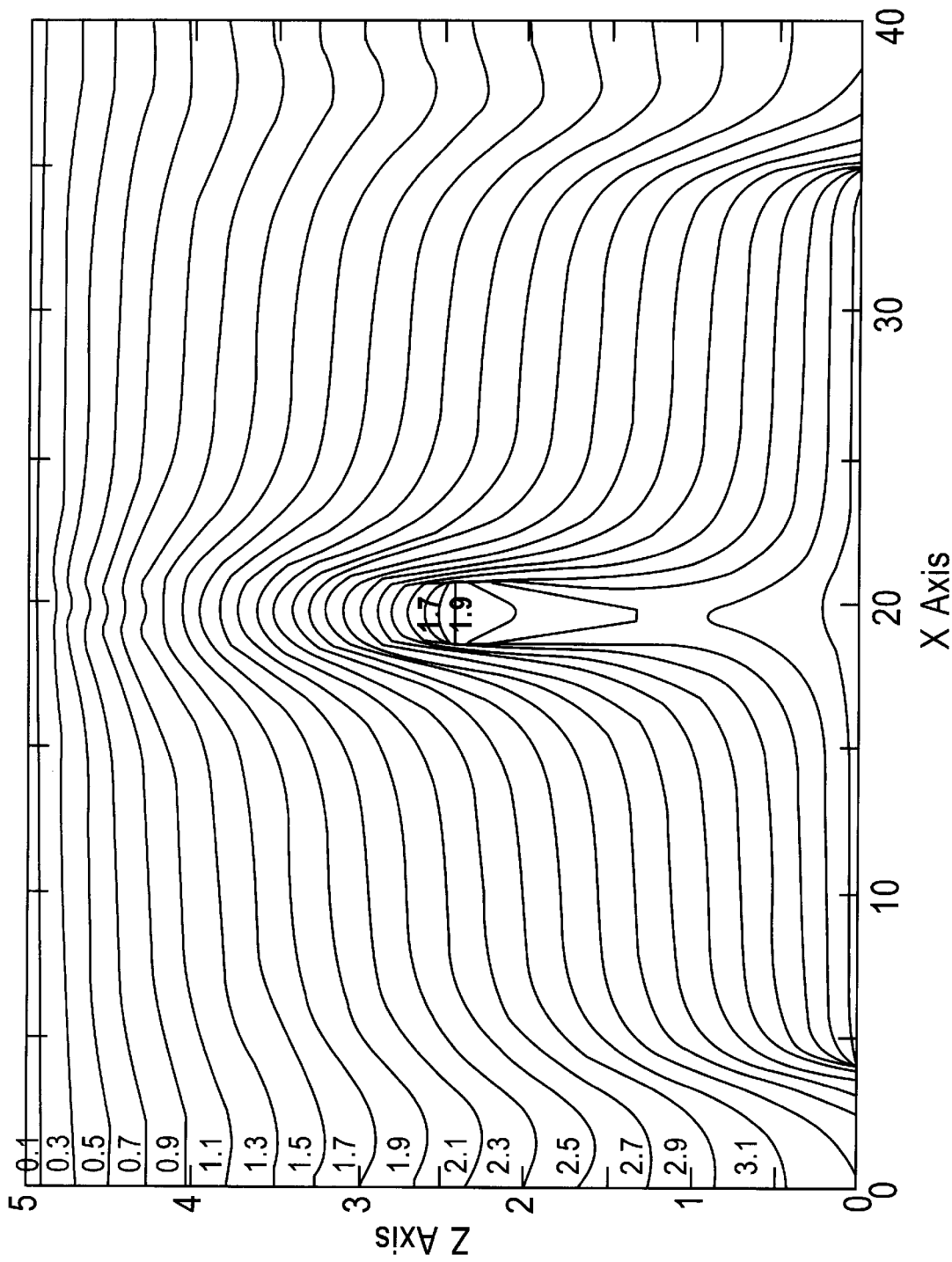
FIG. 21 illustrates the isopotential lines of the homeotropic liquid crystal cell of the present invention cell when a voltage is applied to the cell.
Figure 22:
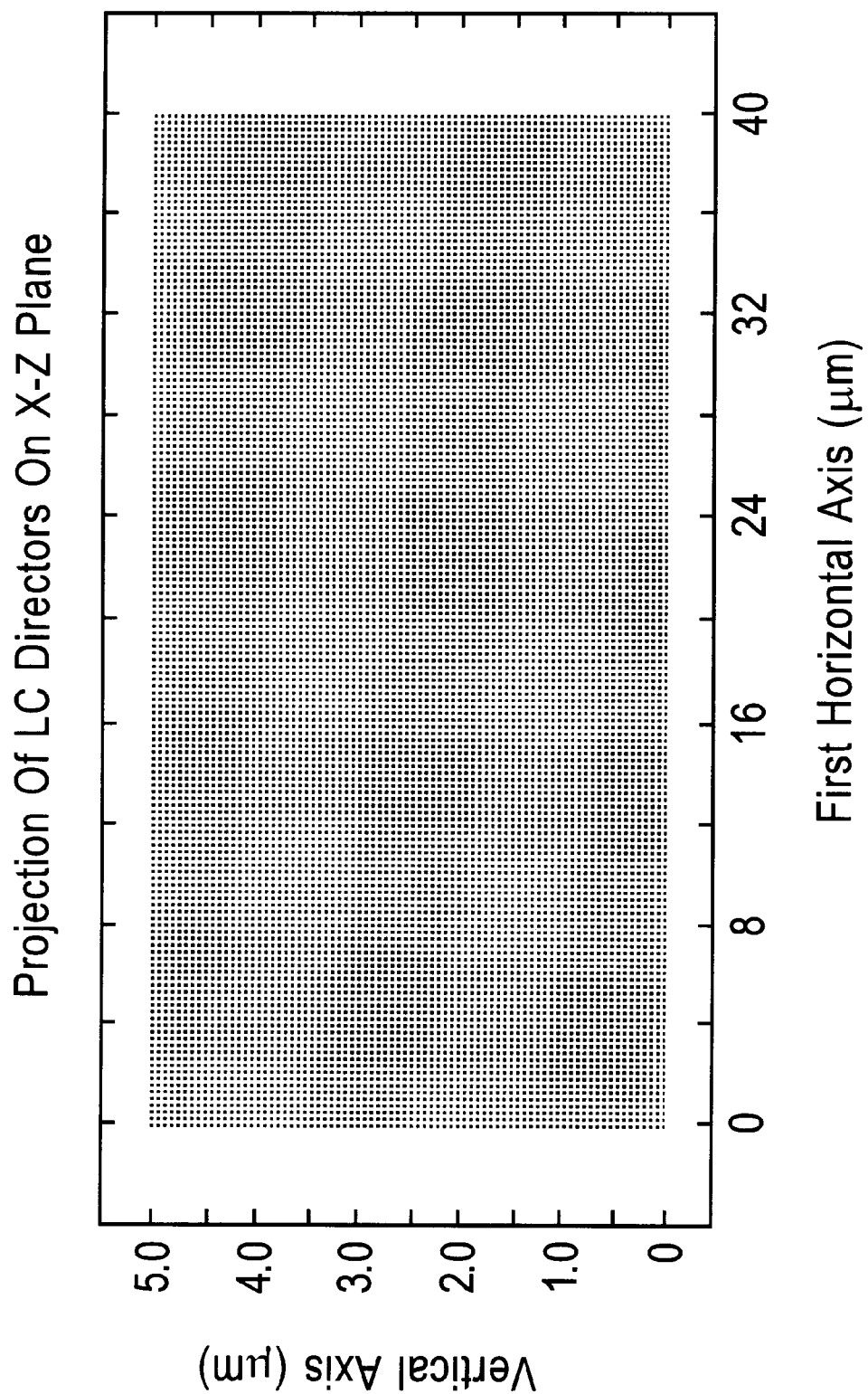
FIG. 22 illustrates the projection of the LC directors on the vertical-horizontal plane of the homeotropic liquid crystal cell of the present invention cell when a voltage is applied to the cell.

FIGS. 21 and 22 illustrate a simulation of the homeotropic liquid crystal cell of the present invention. FIG. 21 illustrates the isopotential lines of the cell when a voltage is applied to the cell. Such isopotential lines indicate that the wall of the present invention produces proper lateral electric fields thereby making the LC molecules tilt in the desired direction such that the pixel is divided into two domains. FIG. 22 illustrates the projection of the LC directors on the vertical-horizontal plane (X-Z plane) of the cell when a voltage is applied to the cell.

While the invention has been described in connection with specific embodiments, it will be understood that those with skill in the art may be able to develop variations of the disclosed embodiments without departing from the spirit of the invention or the scope of the following claims.

What is claimed is:

1. A liquid crystal cell comprising:
   a first substrate;
   a pixel electrode disposed above said first substrate, said pixel electrode having a characteristic width and edges which produce a lateral electric field;
   a second substrate;
   a transparent conductive electrode disposed below said second substrate;
   liquid crystal material disposed between said pixel electrode and said transparent conductive electrode; and
   a wall projecting from said pixel electrode, said conductive electrode or both toward said liquid crystal material, said wall having a width that is less than said characteristic width of said pixel electrode, wherein said wall provides a lateral electric field that acts together with said lateral electric field produced by said edges of said pixel electrode to control tilt direction of said liquid crystal material.

2. The liquid crystal cell of claim 1, wherein said wall comprises a conductive layer.

3. The liquid crystal cell of claim 2, wherein said wall comprises a step of conductive material formed on said pixel electrode.

4. The liquid crystal cell of claim 3, wherein said conductive material is transparent.

5. The liquid crystal cell of claim 4, wherein said conductive material comprises indium tin oxide (ITO).

6. The liquid crystal cell of claim 2, wherein said wall comprises a step of transparent conductive material formed on said transparent conductive electrode.

7. The liquid crystal cell of claim 1, wherein said wall comprises a step of a non-conductive material and said pixel electrode is formed on said step of non-conductive material.

8. The liquid crystal cell of claim 7, wherein said non-conductive material is transparent.

9. The liquid crystal cell of claim 1, wherein said wall comprises a step of a transparent non-conductive material and said transparent conductive electrode is formed on said step of non-conductive material.

10. The liquid crystal cell of claim 1, wherein said wall comprises a non-conductive layer.

11. The liquid crystal cell of claim 10, wherein said wall is formed on said pixel electrode.

12. The liquid crystal cell of claim 11, wherein said non-conductive material is transparent.

13. The liquid crystal cell of claim 10, wherein said wall comprises a step of transparent non-conductive material formed on said transparent conductive electrode.

14. The liquid crystal cell of claim 1, wherein said cell has a characteristic cell gap, and wherein width of said wall is less than 3 times said characteristic cell gap.

15. The liquid crystal cell of claim 1, wherein said cell has a characteristic cell gap, and wherein height of said wall is within a range from one-fifth to four-fifths said characteristic cell gap.

16. The liquid crystal cell of claim 1, comprising a plurality of walls projecting from one of said pixel electrode and said conductive electrode toward said liquid crystal material, wherein width of said walls is less than said characteristic width of said pixel electrode, and wherein each of said walls provides a field that controls tilt direction of said liquid crystal material.

17. The liquid crystal cell of claim 16, wherein portions of said plurality of walls are continuous across cells.

18. The liquid crystal cell of claim 1, wherein said wall has a plurality of branches.

19. The liquid crystal cell of claim 18, wherein said plurality of branches of said wall has a branched-Y configuration.

20. The liquid crystal cell of claim 18, wherein said plurality of branches of said wall has an X configuration.

21. The liquid crystal cell of claim 1, wherein said cell is a hemeotropic-type liquid crystal cell.

22. The liquid crystal cell of claim 1, wherein said cell is a homogenous-type liquid crystal cell.

23. The liquid crystal cell of claim 1, wherein said pixel electrode is transparent.

24. The liquid crystal cell of claim 1, wherein said pixel electrode is reflective.

* * * * *